Feb. 26, 1935.　　　P. CARPENTER　　　1,992,738
LUBRICATED PLUG VALVE
Filed Sept. 8, 1930
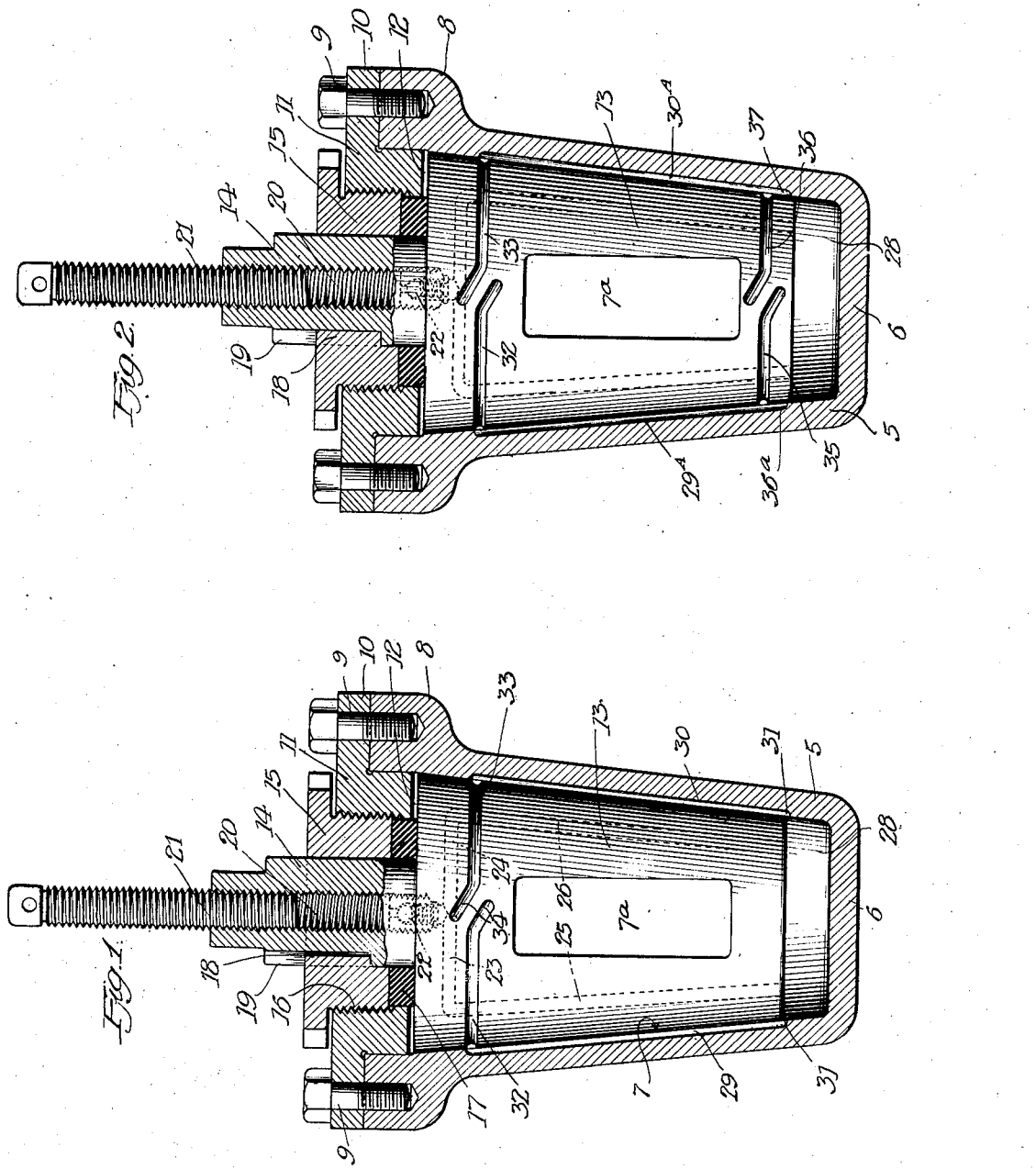

Patented Feb. 26, 1935

1,992,738

UNITED STATES PATENT OFFICE 1,992,738

LUBRICATED PLUG VALVE

Paul Carpenter, Chicago, Ill.

Application September 8, 1930, Serial No. 480,371

9 Claims. (Cl. 251—93)

This invention relates in general to valves, particularly those of the turning plug type and has special reference to an improved form of lubricated plug valve.

While the invention is described and illustrated as applied to a turning plug valve incorporating a tapered seat and plug member, it will be understood by those familiar with the art that the invention is applicable to other types of valves and, therefore, finds a wide field of utility.

The art to which this invention pertains contains disclosures of turning plug valves wherein the lubricant is introduced to the seating or contacting surfaces of the plug valve member and its seat under pressure with the object of raising the plug from its seat by the pressure of lubricant at the contacting surfaces of the valve and its seat to permit of the distribution of the lubricant in a thin film over these contacting surfaces so that, in valves of this character, the valve when in a pipe line and subjected to corrosive liquids, will not be caused to stick in either open or closed position but will be substantially freely operable at all times. It has been found that difficulty is experienced in introducing the lubricant to the contacting surfaces in large types of valves and that insufficient pressure in some cases prevents adequate lubrication of the seating surfaces and also is insufficient to lift the valve from its seat.

It is one of the objects of this invention to provide an improved form of lubricated plug valve wherein adequate pressure is always available for lifting the plug valve member from its seat and for distributing the lubricant over the contacting surfaces of the valve and its seat and wherein the lifting of the valve from its seat is not dependent upon any vertical component of pressure created in the lubricating grooves provided in the surfaces of contact between the valve and its seat.

Other objects and advantages of this invention reside in the provision of an improved lubricated plug valve including means for moving the plug valve member relatively to its seat to permit the introduction of lubricant by the application of pressure to one end of the valve member; the provision of a valve of the character referred to wherein the lubricant thus introduced for application under pressure to one end of the valve member serves to perform a three-fold function, namely, lift the valve from its seat, as it is said, in other words, move the valve axially; secondly, insulate, as it is said, the casing and valve at its so-called bottom against the collection of acids or corrosive liquids which occurs in many of the plug valves of the types known to me and result in corroding the valve in place so that it cannot be turned; and, thirdly, for introducing the lubricant under pressure to the surfaces of contact between the valve and the casing for distributing the lubricating fluid adequately over said surfaces; the provision of a plug valve of the character referred to wherein a repeated renewal of the lubricant in the casing, that is, at the seating surfaces and at one end of the valve member is obtained rather than a collection of lubricant at one end of the valve such as occurs in some of the prior art devices known to me which latter results in a coagulation or drying out of the lubricant thus trapped with the resulting loss of beneficial results.

This invention also has as one of its objects the provision of a valve structure which is of so-called standard design, that is to say, is applicable to valves of the turning plug type which may be readily applied in standard pipe lines and wherein the features of the invention may be incorporated in a standard type of valve without material alteration in the construction and outward appearance; and the provision of a valve of the character referred to wherein a single packing may be employed and this packing may be readily and conveniently renewed without danger of the valve, in service, blowing out of the casing.

The foregoing and such other objects and advantages as may appear or be pointed out as this description proceeds are alleged in the structural embodiments illustrated in the accompanying drawing in which:

Figure 1 is a sectional view along the axis of a turning plug valve showing one form of this invention; and Figure 2 is a view similar to that of Figure 1 illustrating a modified form of the invention.

Referring now more particularly to the drawing and first to Figure 1, a valve casing 5 is provided, which for purposes of illustration, is open at the upper end as viewed in the drawing and closed as at 6 at the bottom end, said casing having an internal bore forming a tapered valve seat 7 which extends from the bottom end of the casing to the upper end as viewed in the drawing. The casing is provided with a fluid passageway, flow therethrough being controlled by a port 7a in the valve member 13.

The larger end of the casing is bordered by an enlarged annular flange 8 formed to receive a plurality of retaining cap screws 9 which pass through the flange 10 of a gland supporting and valve retaining annular plate 11. The gland supporting plate 11 extends into the upper open end of the casing to form an abutment which overlies the enlarged end 12 of the tapered valve member 13, which latter is adapted to rotatably snugly engage the valve seat 7.

The valve plug member 13 is provided with a stem 14 which projects through and beyond the gland 15 which latter is in threaded engagement as at 16 with the gland retaining and supporting plate 11. The gland 15 engages a packing 17 and said gland is provided with a stop member 18 which projects into an arcuate recess 19 provided in the stem 14 for limiting the turning movement of the plug valve member. The packing 17 is resilient and under the compression exerted thereon by the gland 15 tends to hold the valve snugly in its seat.

The stem 14 is provided with a lubricant containing chamber 20 into which a compression screw 21 is threaded for placing the lubricant contained therein under pressure. At the inner end of the chamber 20 I preferably provide a check valve 22 and the chamber 20 is thus placed in communication with radial ducts 23 and 24 which in turn communicate with longitudinal ducts 25 and 26 which pass on either side of the fluid passage-way 7a and through the valve member, communicating with a lubricant containing cellar 28 formed by the bottom wall 6 of the casing 5 and the adjacent end of the plug valve member so that lubricant introduced into the chamber 20 in sufficient quantity will eventually fill the cellar 28.

The lubricant thus supplied to the cellar 28 is in turn distributed over the surfaces of contact of the valve in its casing by the provision of two or more longitudinal grooves 29 and 30, which for the purpose of Figure 1 are shown permanently in communication with the cellar 28 as indicated at 31, 31. These grooves 29 and 30 may be provided in either the valve or the valve seat and at their ends remote from the cellar 28 are in communication with circumferential grooves 32 and 33 which latter may be provided either in the valve member or in the valve seat. The grooves 32 and 33 are interrupted and have their ends overlapping as indicated at 34.

The invention thus shown in Figure 1 operates in such manner that when the cellar 28, ducts 25, 26 and lubricant chamber 20 are completely filled with lubricant, the lubricant thus contained may be placed under pressure by screwing in on the compressor screw 21 which places the lubricant under pressure in the cellar 28, thus separating the valve from its seat. Lubricant will thus be conveyed through the grooves 29 and 30 to the surfaces of contact of the valve in its seat, some of the lubricant extending to the circumferential grooves 32 and 33 which further hastens the distribution of the lubricant over the seating surfaces. The area of contact of the lubricant with the smaller end of the plug valve member operates to move the plug valve member axially relatively to its seat, as it is commonly said, lift the plug valve member from its seat, to permit of the introduction of lubricant between the surfaces of contact.

Referring now to the form of invention shown in Figure 2, it will be observed that the structure of the valve member is substantially identical with that shown in Figure 1 and, therefore, a description of the whole structure of Figure 2 need not be repeated. It is sufficient to point out that the difference in the form of the invention shown in Figure 2 over that shown in Figure 1 resides particularly in the provision of an additional set of circumferential grooves indicated at 35 and 36 adjacent to the smaller end of the plug valve member and that the grooves 29A and 30A are not in permanent communication with the cellar 28, but are terminated short of communication with the cellar 28 as indicated at 36a and 37. However, when the valve is raised, as it is said, from its seat, the lubricant flows from the chamber 28 into the grooves 29A and 30A due to the establishment of communication with these grooves at that time.

From the foregoing, it will be understood that the lubricant cellar 28 serves the chief purposes of primarily lifting the plug off its seat to permit the introduction of lubricant under pressure to the surfaces of contact of the plug member and its seat; and serves to repeatedly change the lubricant in the cellar 28 and prevent drying out or clogging of the contents of this chamber and, in addition, serves to prevent the accumulation of liquids from the pipe line at this point which often occurs in the prior art devices known to me constructed with a closed bottom wall. Furthermore, owing to the relatively large surface of contact exposed to the pressure of the lubricant at this point, there is always sufficient force thus exerted to move the valve axially for the purpose described.

Having thus described my invention and illustrated its use, what I claim as new and desire to secure by Letters Patent is:

1. In a valve, a casing having a valve seat, a valve member engaging said seat, a lubricant chamber in said valve member, a lubricant cellar in said casing at one end of said valve member and communicating with said lubricant chamber, means for placing the lubricant under pressure against the end of said valve member for first moving the valve member by said pressure relatively to its seat, and means for subsequently conducting the lubricant thus under pressure to the surfaces of contact of the valve member and its seat.

2. In a valve structure, a casing having a valve seat, a valve member engaging said seat, a lubricant chamber in said valve structure, a lubricant cellar in said casing at one end of said valve structure and communicating with said lubricant chamber means for placing the lubricant under pressure for moving the valve member relatively to its seat, and means for conducting the lubricant thus under pressure to the surfaces of contact of the valve member and its seat, said conducting means establishing communication only when the valve member is moved axially of its seat.

3. In a valve, a tapered valve seat having a fluid passageway and a tapered plug valve member having a port for controlling said passageway, said valve member terminating short of the smaller end of the casing to form a lubricant cellar, means for introducing a plastic substance under pressure first to said cellar to act on the adjacent end surface of the valve member for moving it relatively to its seat, and means for subsequently conducting the lubricant from said cellar to the contacting surfaces of the valve and its seat.

4. In a valve, a tapered valve seat having a fluid passageway and a tapered plug valve member having a port for controlling said passageway, said valve member terminating short of the smaller end of the casing to form a lubricant cellar, means for introducing a plastic substance under pressure first to said cellar to act on the adjacent end surface of the valve member for moving it relatively to its seat, and means for subsequently conducting the lubricant from said cellar to the contacting surfaces of the valve and its seat, said means comprising grooves in the surface of contact of the valve member and its seat forming a substantially continuous grooved lubricant circuit around said port.

5. In a valve, a tapered valve seat having a fluid passageway and a tapered plug valve member having a port for controlling said passageway, said valve member terminating short of the smaller end of the casing to form a lubricant cellar, means for introducing a plastic substance under pressure to said cellar to act on the adjacent end of the valve member for moving it relatively to its seat, and means for conducting the lubricant from said cellar to the contacting surfaces of the valve and its seat, said last mentioned means comprising longitudinal grooves terminating short of said cellar, but adapted to communicate therewith upon axial movement of the valve relatively to its seat.

6. In a valve, a tapered valve seat having a fluid passageway and a tapered plug valve member having a port for controlling said passageway, said valve member terminating short of the smaller end of the casing to form a lubricant cellar, means for introducing a plastic substance under pressure to said cellar to act on the adjacent end of the valve member for moving it relatively to its seat, and means for conducting the lubricant from said cellar to the contacting surfaces of the valve and its seat, said last mentioned means comprising longitudinal grooves terminating short of said cellar, but adapted to communicate therewith upon axial movement of the valve relatively to its seat, and transverse grooves in the surface of contact of the valve and seat communicating with said longitudinal grooves.

7. In a valve, a casing having a passageway for fluid and having a valve seat, a valve member engaging said seat, a resilient packing under compression for holding said valve on its seat, a cellar for plastic substance in said casing at one end thereof, means for placing the plastic substance therein under pressure first for moving the valve relatively to its seat against the compression of said packing, and means including longitudinal and transverse grooves for thereafter conducting the plastic substance thus under pressure to the contacting surfaces of the valve member and its seat, and thereby forming with said cellar a substantially complete seal around said passageway for fluid.

8. In a valve structure, a casing having a valve seat, a valve member engaging said seat, a lubricant cellar in said casing at one end of said valve member, means in said valve structure for placing the lubricant under pressure for moving the valve member relatively to its seat, and means for conducting lubricant thus under pressure to the surfaces of contact of the valve member and its seat, said means being arranged so that the lubricant supplied to said surfaces is admitted thereto or excluded therefrom by a portion of the valve member itself when moved axially of its seat.

9. In a valve structure, a casing having a valve seat, a valve member engaging said seat, a cellar for plastic substance in said casing at one end thereof, a lubricant chamber in said valve member, internal ducts in said valve member for establishing communication between said chamber and cellar, means for placing the plastic substance under pressure first in said cellar, to move said valve axially in its seat, and grooves in the surface of contact of the valve and seat for subsequently conducting such lubricant under pressure to said surface of contact.

PAUL CARPENTER.